US012686817B2

(12) United States Patent
Wang et al.

(10) Patent No.: US 12,686,817 B2
(45) Date of Patent: Jul. 21, 2026

---

(54) METHODS FOR SYNTHESIZING FLUORESCENT CQDs AND NITROGEN-PHOSPHORUS CO-DOPED FLUORESCENT CQDs AND APPLICATION THEREOF

(71) Applicant: Shaanxi University of Science & Technology, Xi'an City (CN)

(72) Inventors: Chuanyi Wang, Xi'an City (CN); Haitao Ren, Xi'an City (CN)

(73) Assignee: Shaanxi University of Science & Technology, Xi'an City (CN)

( * ) Notice: Subject to any disclaimer, the term of this patent is extended or adjusted under 35 U.S.C. 154(b) by 1058 days.

(21) Appl. No.: 17/852,694

(22) Filed: Jun. 29, 2022

(65) Prior Publication Data

US 2023/0227719 A1 Jul. 20, 2023

(30) Foreign Application Priority Data

Jan. 18, 2022 (CN) .......................... 202210057004.8
Apr. 27, 2022 (CN) .......................... 202210454107.8

(51) Int. Cl.
*C01B 32/15* (2017.01)
*C09K 11/65* (2006.01)
*G01N 21/64* (2006.01)

(52) U.S. Cl.
CPC .............. *C09K 11/65* (2013.01); *C01B 32/15* (2017.08); *G01N 21/6428* (2013.01); *C01P*

*2004/64* (2013.01); *C01P 2006/60* (2013.01); *G01N 2021/6439* (2013.01)

(58) Field of Classification Search
CPC .............. C01B 32/15–18; C09K 11/65; G01N 21/6428; G01N 2021/6439; C01P 2004/64; C01P 2006/60
See application file for complete search history.

(56) References Cited

FOREIGN PATENT DOCUMENTS

CN 110791289 A * 2/2020 ......... G01N 21/6428
CN 111792638 A * 10/2020 ............. B82Y 20/00

* cited by examiner

*Primary Examiner* — Stuart L Hendrickson
(74) *Attorney, Agent, or Firm* — Cooper Legal Group, LLC

(57) ABSTRACT

A method for synthesizing fluorescent carbon quantum dots (CQDs) and nitrogen-phosphorus co-doped fluorescent CQDs and applications are provided. Firstly, a mixture of leaf powder and deionized water is subjected to hydrothermal reaction at 200-240° C. to obtain a product A, followed by removing by-products in it and drying to obtain fluorescent CQDs; nitrogen-phosphorus co-doped fluorescent CQDs are obtained by replacing the product A with a product B and treating the product B in a same way as the product A, where product B is obtained as follows: a mixed system of leaf powder, urea phosphate and deionized water is subjected to hydrothermal reaction at 200-240° C. with a mass ratio of urea phosphate to leaf powder as less than or equal to 0.2 to obtain the product B.

3 Claims, 14 Drawing Sheets

METHODS FOR SYNTHESIZING FLUORESCENT CQDs AND NITROGEN-PHOSPHORUS CO-DOPED FLUORESCENT CQDs AND APPLICATION THEREOF

CROSS-REFERENCE TO RELATED APPLICATIONS

The present application claims priorities to Chinese Patent Application No. 202210057004.8, filed on Jan. 18, 2022, and Chinese Patent Application No. 202210454107.8, filed on Apr. 27, 2022, the contents of the above-mentioned patent applications are hereby incorporated by reference.

TECHNICAL FIELD

The present application relates to the field of synthesis and application of carbon quantum dots (CQDs), and in particular to a method for synthesizing CQDs and nitrogen-phosphorus co-doped fluorescent CQDs and application thereof.

BACKGROUND

Recent years see great development of quantum dot materials with important potential in applications such as environmental detection, photocatalysis, electronic devices and biomedicine. Semiconductor quantum dots such as CdSe, ZnS, CdS and Si are commonly used with controllable sizes, narrow emission wavelength ranges and high luminescence quantum yields; however, applications of such semiconductor quantum dots remain limited due to poor water solubility, complicated synthesis process, poor chemical stability and high toxicity.

Compared with semiconductor quantum dots, fluorescent CQDs, as a type of zero-dimensional carbon nanomaterial, not only has a stable structure of carbon nanomaterials, but also has fluorescent performance of conventional quantum dots; in addition to that, fluorescent CQDs also have more superior characteristics than conventional quantum dots, such as fine particle sizes, high fluorescence stability, tunable emission wavelength, good water solubility, good biocompatibility, low toxicity, and easy surface functionalization; such features enable CQDs to show great potential in the fields of environmental pollutant detection, bio-imaging, photocatalysis and optoelectronic devices, etc.

A variety of methods are currently used to synthesize fluorescent CQDs, such as arc discharging, microwave heating, electrochemical exfoliation, strong acid oxidation, high-energy ball milling, solvothermal/hydrothermal and ultrasonic synthesis; nevertheless, several problems, including lengthy purification processes, toxic reagents, expensive precursors, complex experimental setups, rigorous reaction conditions, unwanted by-products, low quantum yields and high costs, are associated with these methods and greatly limit the large-scale and low-cost production and practical applications of CQDs. Therefore, it is of great practical importance to develop a rather green, simple and cost-effective method for synthesizing CQDs with high fluorescence quantum yields so as to promote the practical application of CQDs.

$Fe^{3+}$ is a heavy metal ion that has been identified as one of the main causes for contamination of water, soil and other substrates. It is hazardous to the aquatic environment and human health when $Fe^{3+}$ is present in water at levels above 0.3 mg/L, making determination of $Fe^{3+}$ in water of great importance; however, methods available for detecting $Fe^{3+}$ include atomic absorption spectrometry, inductively coupled plasma mass spectrometry and electrochemical analysis, etc., requiring expensive instruments, complex operations, tedious sample handling procedures and high costs, to name a few; it is therefore of great significance to develop a simple, efficient and cost-effective method for detecting $Fe^{3+}$ in water.

At present, the most widely studied bioimaging agents are organic fluorescent dyes and semiconductor quantum dots, where organic fluorescent dyes offer poor photostability which makes long-term imaging difficult, and semiconductor quantum dots are not widely used in bioimaging because of their high photobleaching potential and toxicity; but, CQDs show significant advantages against semiconductor quantum dots and organic fluorescent dyes in the field of cellular imaging owing to their properties of low synthetic cost, good hydrophilicity, low toxicity, good biocompatibility and fluorescence stability.

SUMMARY

Aiming at problems existing in the prior art, the present application provides a method for synthesizing fluorescent carbon quantum dots (CQDs) and nitrogen-phosphorus co-doped fluorescent CQDs and applications thereof. The method is environmental-friendly, cost-effective and improves quantum yields of biomass-based fluorescent CQDs significantly, and the obtained CQDs are used as fluorescent probes for detecting microelement $Fe^{3+}$ in tap water and for cellular imaging.

The present application is realized by the following technical scheme:

a method for synthesizing fluorescent CQDs may include the following steps:

S1, performing hydrothermal reaction on a mixture formed by leaf powder and deionized water at temperature in a range of 200-240° C. to obtain a product A; and S2, removing by-products in the product A, and drying to obtain the fluorescent CQDs.

Preferably, the mixture in S1 is heated from room temperature to 200-240° C. at a heating rate in a range of 5-10° C./min.

Preferably, the mixture in S1 is subjected to the hydrothermal reaction at a temperature in a range of 200-240° C. for a time period of 5-6 hours (h) to obtain the product A.

Preferably, the product A in S2 is filtered by an organic filter membrane and an aqueous filter membrane for several times, a filtered filtrate is collected, and the filtrate is freeze-dried to obtain the fluorescent CQDs.

The present application also provides fluorescent CQDs obtained by any one of the above methods for synthesizing fluorescent CQDs.

A method for synthesizing nitrogen-phosphorus co-doped fluorescent CQDs may include the following steps:

replacing the product A mentioned above by a product B, and treating in a same way as treating the product A in the above method to obtain nitrogen-phosphorus co-doped fluorescent CQDs, where the product B is obtained according to the following process: and mixing leaf powder, urea phosphate and deionized water into a mixed system, carrying out a hydrothermal reaction at temperature in a range of 200-240° C. with a mass ratio of urea phosphate to leaf powder less than or equal to 0.2, and obtaining the product B.

In addition, the present application provides nitrogen-phosphorus co-doped fluorescent CQDs obtained by any one of the above methods for synthesizing nitrogen-phosphorus co-doped fluorescent CQDs.

Furthermore, the application provides a use of the nitrogen-phosphorus co-doped fluorescent CQDs as a fluorescent probe in detecting a trace amount of $Fe^{3+}$ in water environment and/or in cellular imaging.

Compared with the prior art, the application has the following beneficial technical effects:

the application relates to a method for synthesizing fluorescent CQDs, which includes the following steps: performing one-step hydrothermal reaction on a mixture of leaf powder and deionized water, and then removing by-products in obtained products and drying to obtain fluorescent CQDs; in this method, discarded apple leaves are used as carbon sources, which not only reduces environmental pollution from agroforestry wastes, but also enables a green and low-cost synthesis of CQDs; compared with the current synthetic method of CQDs, the method according to the application has the advantages of easy operation, simple post-treatment, no need for high-speed centrifugation and dialysis, wide sources of raw materials, low costs in addition to no expensive and polluting chemical reagents added; and wastes are changed into things of value so as to realize efficient utilization of agricultural and forestry wastes; the method complies with green, low-cost industrial requirements and is suitable for further scale-up production.

According to the method for synthesizing nitrogen-phosphorus co-doped fluorescent CQDs, carbon source leaf powder and a small amount of urea phosphate are added in one-step hydrothermal reaction to realize synchronous co-doping of nitrogen and phosphorus and significant improvement of quantum yield of biomass-based fluorescent CQDs. Waste apple leaves are used as carbon sources, the environmental pollution caused by agricultural and forestry wastes is reduced, and CQDs are synthesized in a green and low-cost way. Compared with the current synthetic methods of CQDs, the method for synthesizing nitrogen-phosphorus co-doped fluorescent CQDs obtained by the application has the advantages of easy operation, simple post-treatment, no need for high-speed centrifugation and dialysis, wide sources of raw materials, low costs, no use of expensive and polluting chemical reagents; and wastes are changed into things of value so as to realize efficient resource utilization of agricultural and forestry wastes; the method complies with green, low-cost industrial requirements and is suitable for further scale-up production.

The fluorescent CQDs and nitrogen-phosphorus co-doped fluorescent CQDs synthesized by the application have high crystallinity, nearly spherical shapes, small sizes, a narrow distribution range of sizes, rich surface functional groups, low toxicity, good biocompatibility, good hydrophilicity and stable fluorescent performance. Nitrogen-phosphorus co-doped fluorescent CQDs has rather high fluorescence quantum yields; it can be used as a fluorescent probe for detecting $Fe^{3+}$ with a detection limit of 4.0 μM, which is less than the limited concentration of Fe in drinking water of 5.4 μM, allowing rapid and sensitive detection of trace amounts of $Fe^{3+}$ in tap water; it can also be used as a fluorescent probe reagent to label cells for biological imaging. The obtained CQDs have great application value in sensors, biological imaging, environmental pollutant detection, photocatalysis, optoelectronic devices and other fields.

DETAILED DESCRIPTION OF THE EMBODIMENTS

Further details of the application are described below in conjunction with specific embodiments, and the descriptions are explanatory and not limiting.

Apple leaves (including leaves from fallen leaves and dead branches, etc.) are a common agricultural and forestry waste left in the fields after the harvesting of apples. Each year, about 9 million tons of apple tree leaves are discarded all over China, which provides a good economic basis for the low-cost and large-scale production of carbon quantum dots (CQDs). Apple leaves provide a green and natural carbon source for synthesizing CQDs, as they are rich in crude fibers, vitamins, lignin, cellulose and hemicellulose. There are several ways of treating agricultural and forestry waste: firstly, by shredding and returning it to the fields, which, however, may cause pests and diseases, leading to soil pollution and affecting the growth of crops; secondly, by burning it on the spot or using it as firewood, which can lead to air pollution; thirdly, by foddering the dead leaves and branches, which imposes high requirements on raw materials and is only suitable for areas with a developed farming industry. Therefore, it is a promising strategy to efficiently utilize apple leaf waste into valuable functional carbon materials, which can reduce the releasing of carbon dioxide and play a very positive role in solving energy and ecological environment problems.

Therefore, the present application discloses an environmental-friendly and cost-effective method for synthesizing fluorescent CQDs and nitrogen-phosphorus co-doped fluorescent CQDs, including: firstly, cleaning discarded apple leaves, performing drying and grinding, then placing 1.0 gram (g) of the ground leaves in a hydrothermal reaction kettle, then adding deionized water and no more than 0.2 g of urea phosphate (used for nitrogen-phosphorus co-doped fluorescent CQDs), mixing evenly; then, carrying out hydrothermal reaction at 200-240° C. for 5-6 hours (h) at a heating rate of 5-10° C./minute (min) to ensure synthesis of high quality fluorescent CQDs and avoid excessive energy consumption; then performing filtration and freeze-drying, obtaining corresponding fluorescent CQDs.

Embodiment 1

Figure 1:
FIG. 1 is a photo of discarded apple leaves according to the present application.
Figure 2:
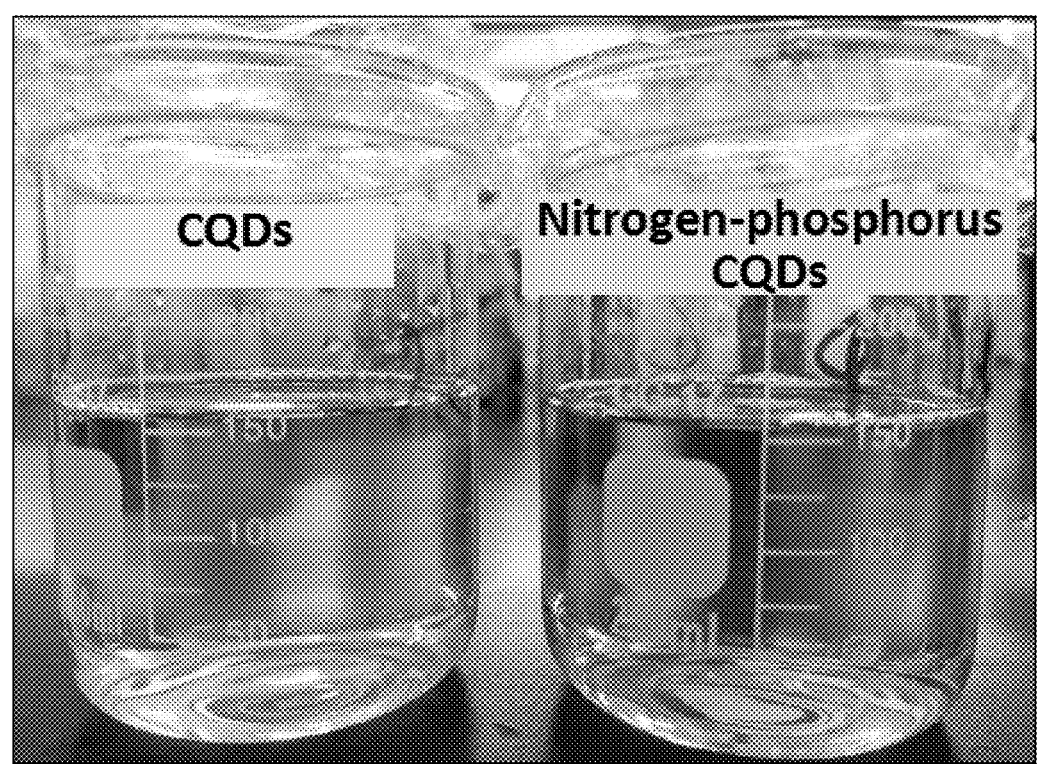
FIG. 2 shows a photo of fluorescent carbon quantum dots (CQDs) aqueous solution and nitrogen-phosphorus co-doped fluorescent CQDs aqueous solution synthesized respectively in Embodiment 1 and Embodiment 3 of the present application.
Figure 3:
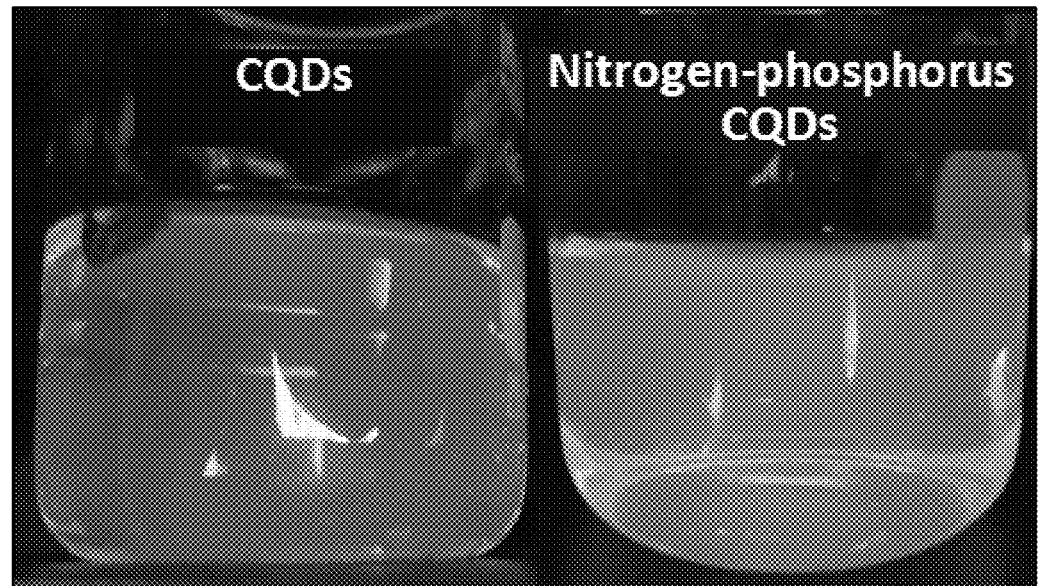
FIG. 3 shows a fluorescence photo of fluorescent CQDs aqueous solution and nitrogen-phosphorus co-doped fluorescent CQDs aqueous solution synthesized respectively in Embodiment 1 and Embodiment 3 of the present application under 365 nm ultraviolet lamp.
Figure 4:
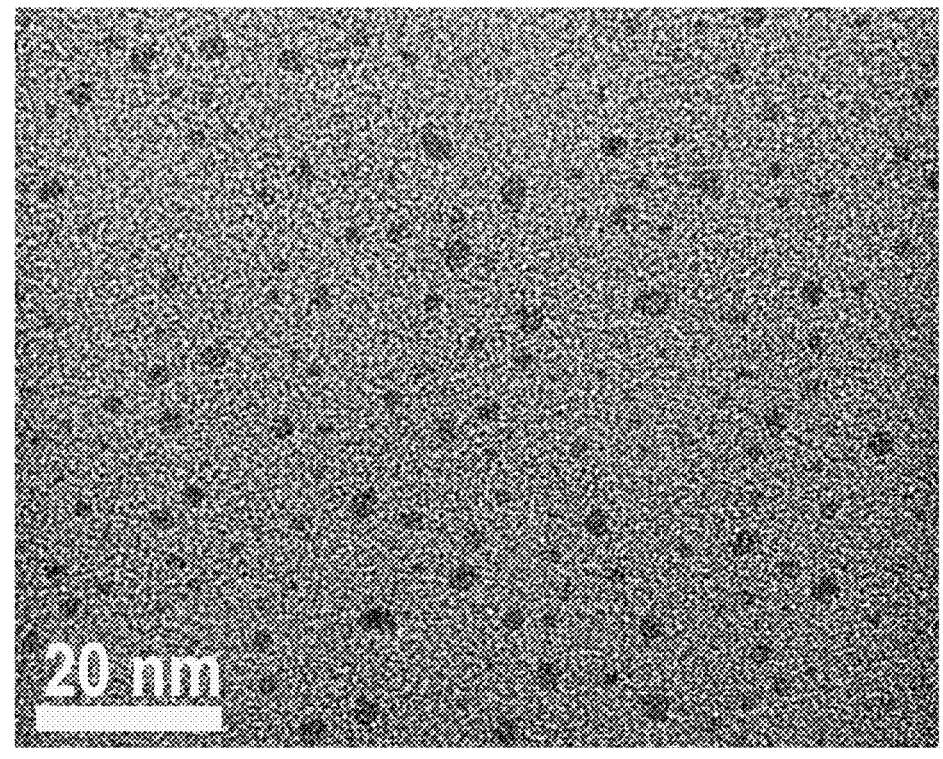
FIG. 4 shows a TEM picture of nitrogen-phosphorus co-doped fluorescent CQDs synthesized in Embodiment 1 of the present application.
Figure 5:
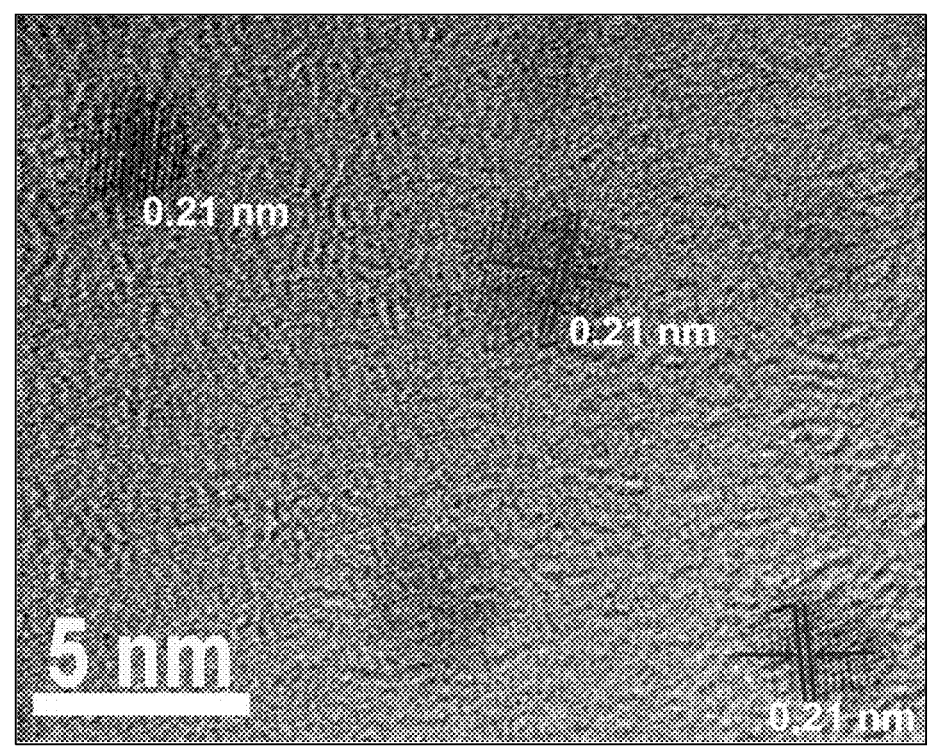
FIG. 5 shows a high-resolution TEM image of nitrogen-phosphorus co-doped fluorescent CQDs synthesized in Embodiment 1 of the present application.
Figure 6:
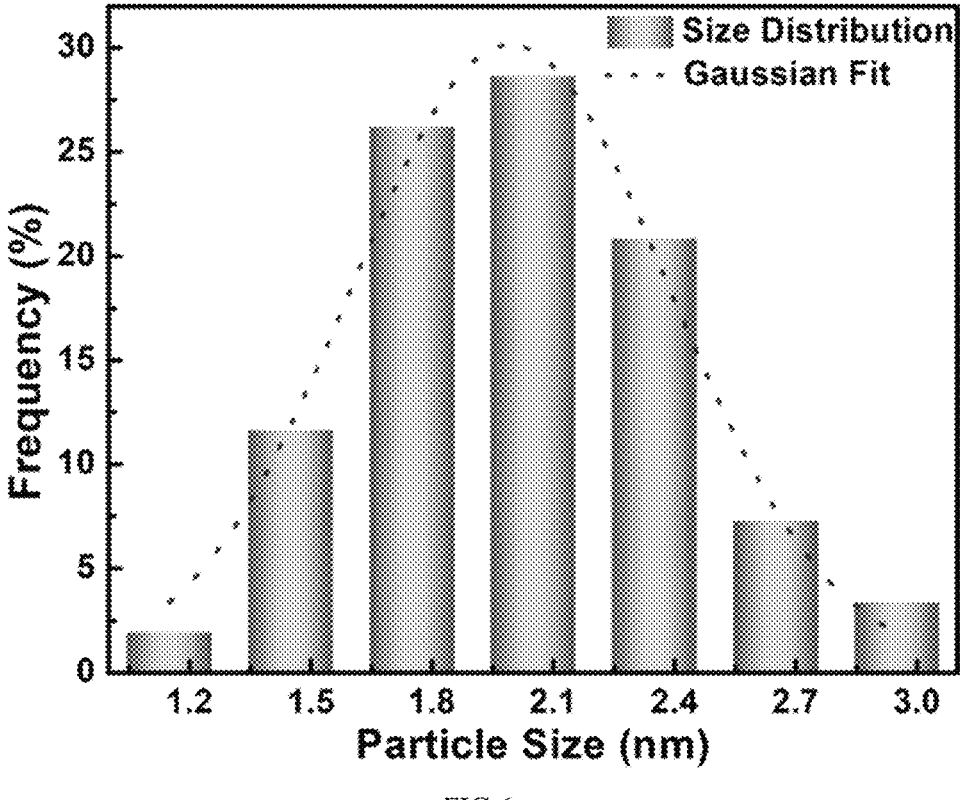
FIG. 6 is a histogram of particle size distribution of nitrogen-phosphorus co-doped fluorescent CQDs synthesized in Embodiment 1 of the present application.
Figure 7:
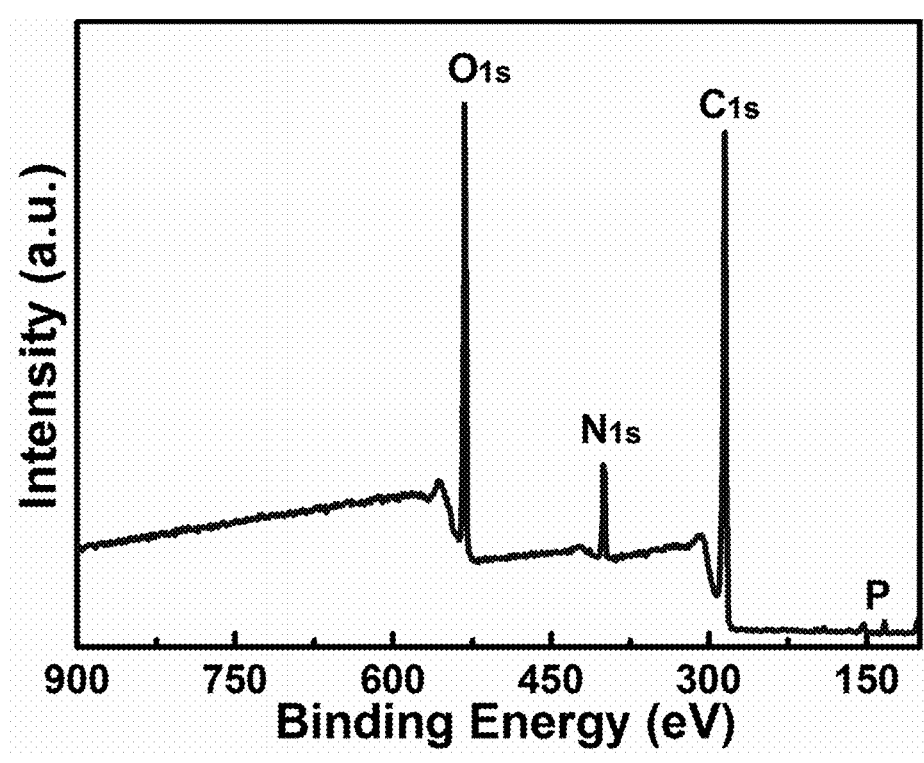
FIG. 7 illustrates X-ray photoelectron spectroscopy (XPS) spectra of nitrogen-phosphorus co-doped fluorescent CQDs synthesized in Embodiment 1 of the present application.
Figure 8:
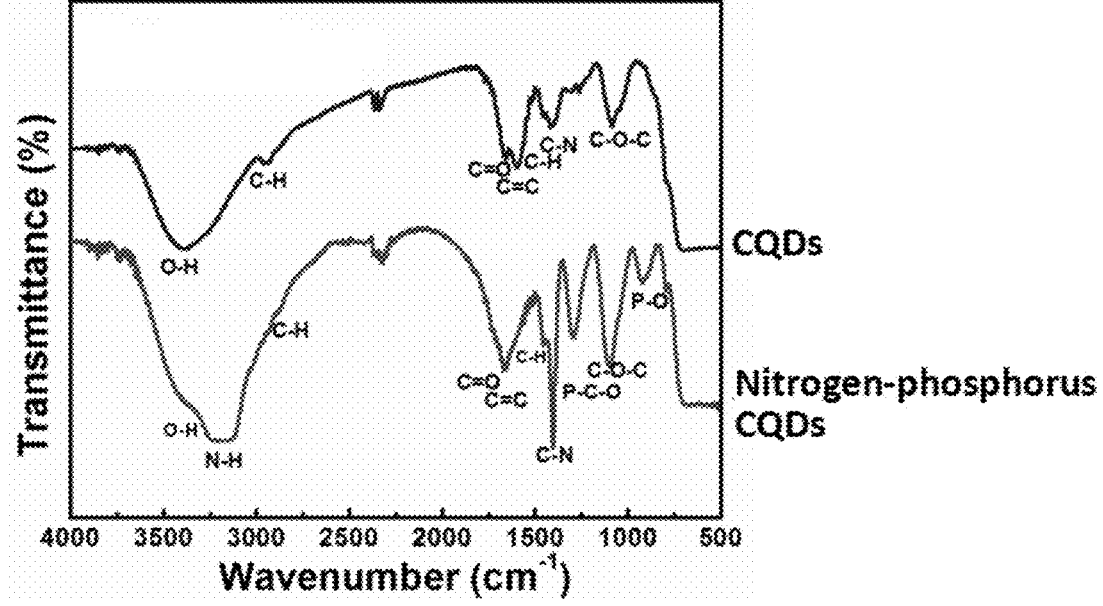
FIG. 8 shows infrared spectra of nitrogen-phosphorus co-doped fluorescent CQDs and fluorescent CQDs synthesized in Embodiment 1 and Embodiment 3 of the present application, respectively.
Figure 9:
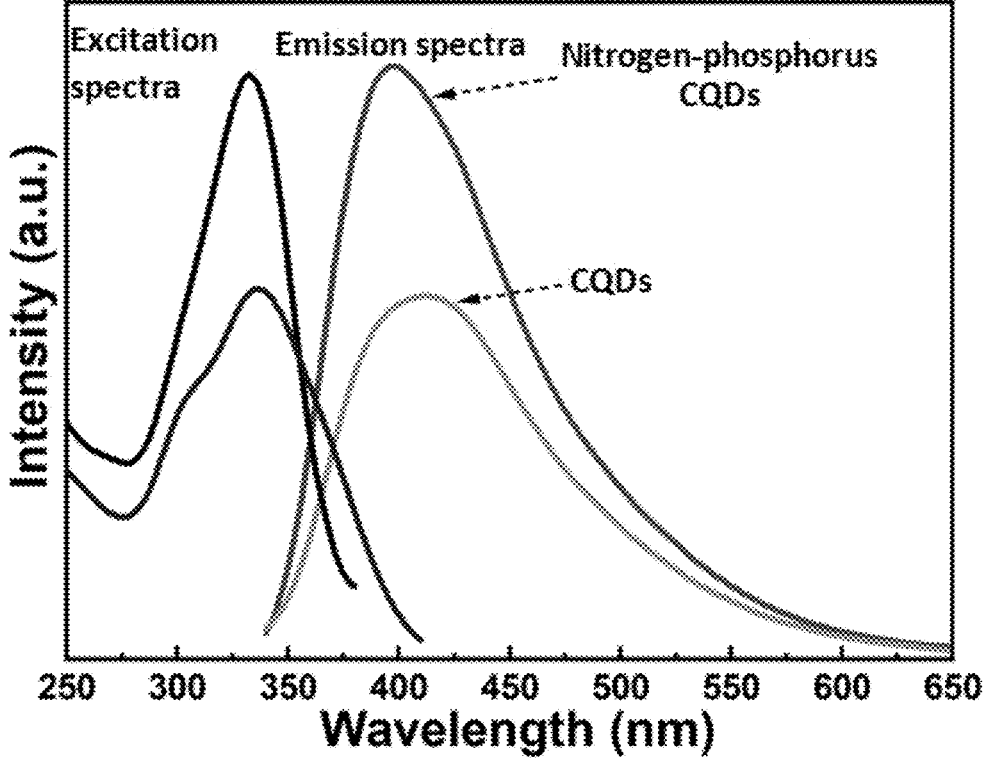
FIG. 9 shows excitation spectra and emission spectra of nitrogen-phosphorus co-doped fluorescent CQDs and fluorescent CQDs synthesized in Embodiment 1 and Embodiment 3, respectively.
Figure 10:
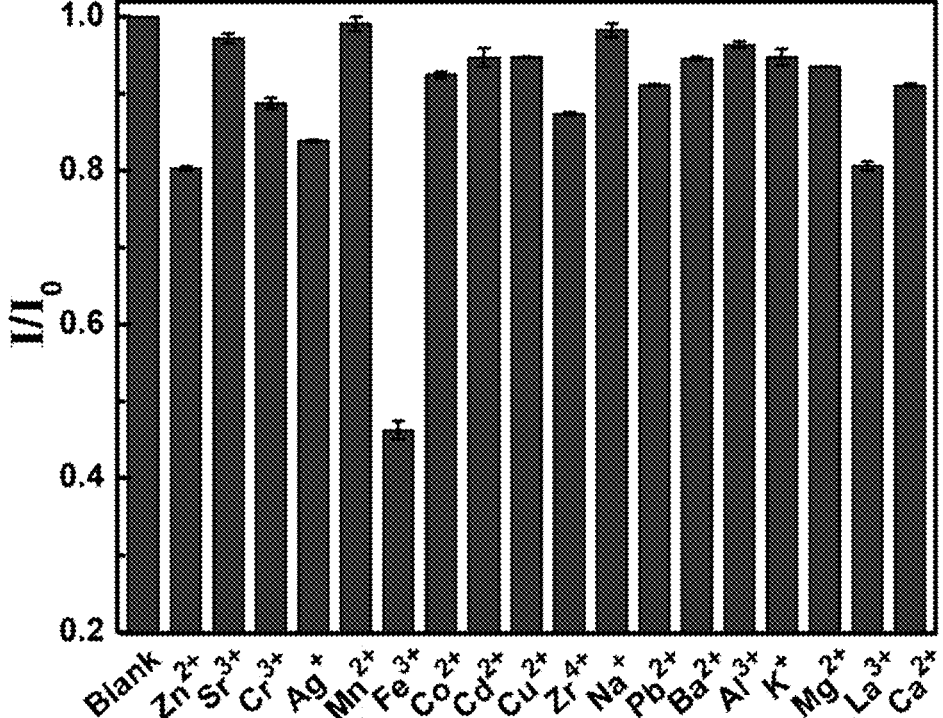
FIG. 10 is a histogram of selective identification of $Fe^{3+}$ in water by nitrogen-phosphorus co-doped fluorescent CQDs synthesized in Embodiment 1 of the present application.
Figure 11:
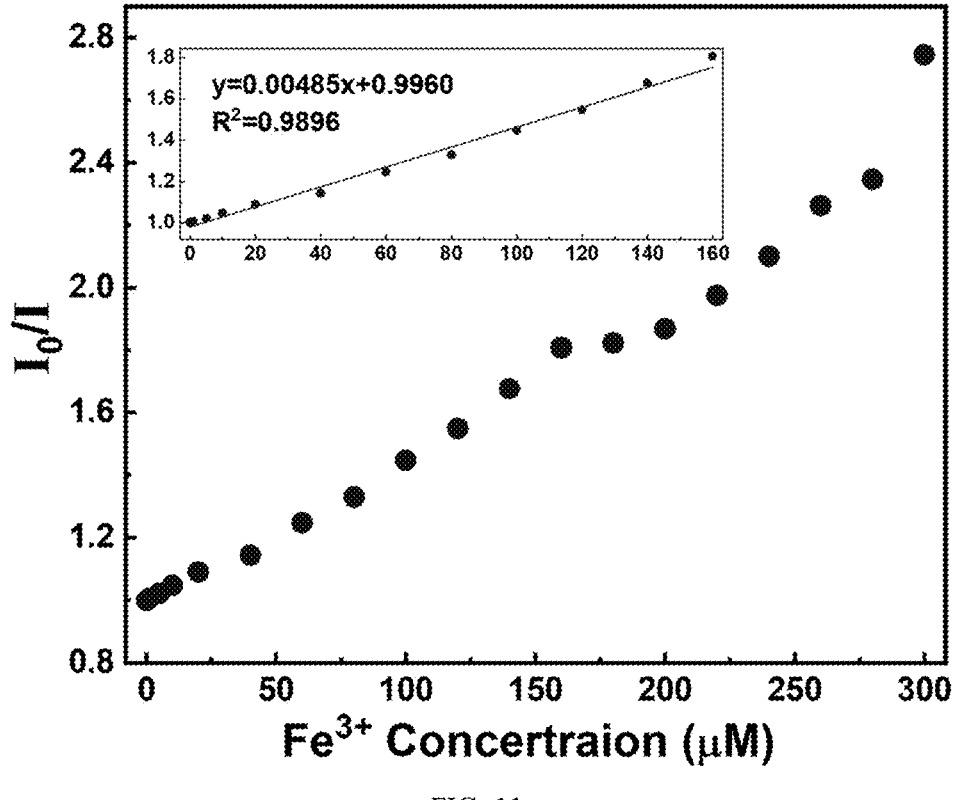
FIG. 11 illustrates a standard curve of $Fe^{3+}$ detection in water by nitrogen-phosphorus co-doped fluorescent CQDs synthesized in Embodiment 1 of the present application.
Figure 12A:
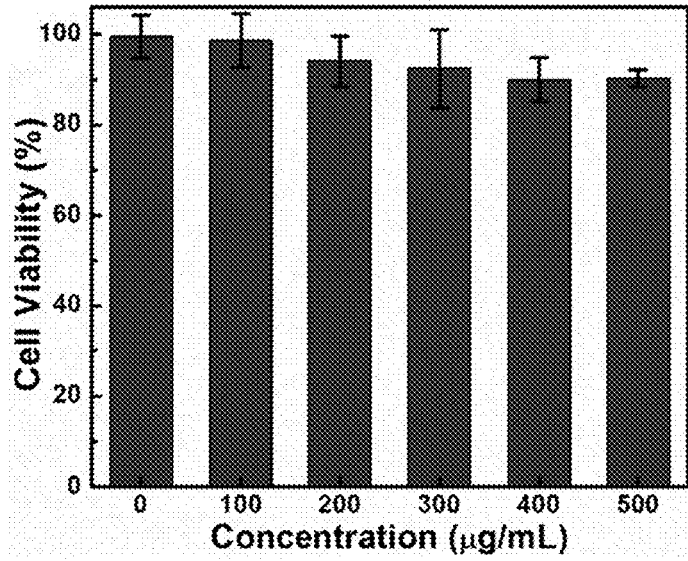
FIG. 12a shows variation in cytotoxicity of nitrogen-phosphorus co-doped fluorescent CQDs synthesized in Embodiment 1 of the present application.
Figure 12B:
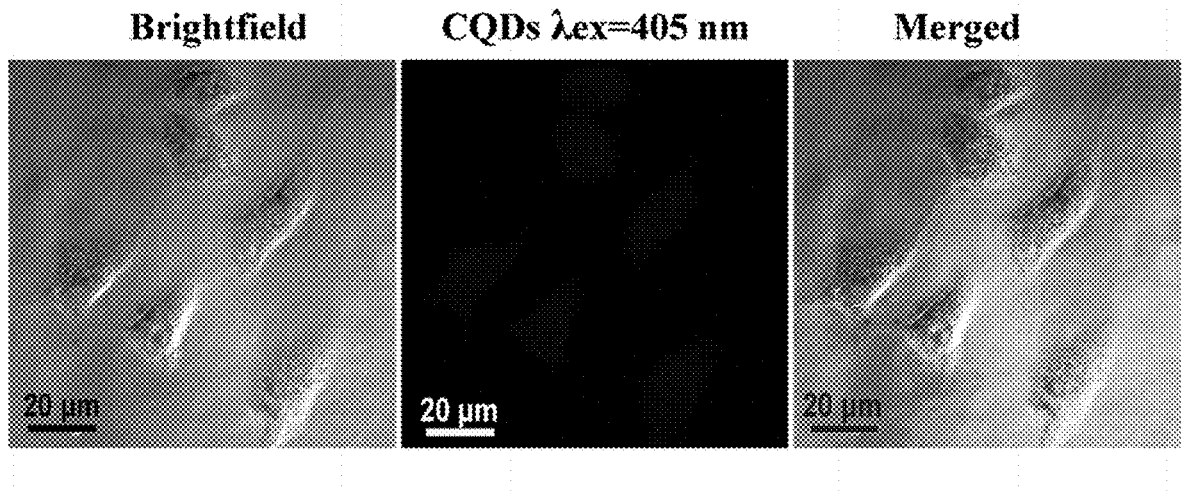
FIG. 12b shows diagrams of cell labeling imaging of nitrogen-phosphorus co-doped fluorescent CQDs synthesized in Embodiment 1 of the present application.

A method for synthesizing nitrogen-phosphorus co-doped fluorescent CQDs in a green and cost-effective way and application, including the following steps:

1) collecting discarded apple leaves as shown in FIG. 1, cleaning them with deionized water, drying them in an oven at 80° C. for 24 h, and then grinding them into powder with a mortar;
2) dissolving 0.2 g urea phosphate in 60 milliliters (mL) of deionized water, then adding 1.0 g leaf powder and mixing well into a mixture; transferring the mixture to a 100 mL reaction kettle, then putting the reaction kettle in an oven, heating it to 240° C. at a heating rate of 5° C./min, and keeping the temperature for 6 h;
3) taking out the reaction kettle when the oven temperature drops to room temperature, taking out lining, pouring reactants into a 100 mL beaker, and then filtering the reactants with 0.22 (filter pore size) micrometer (μm) of organic filter membrane and 0.22 μm ((filter pore size)) aqueous filter membrane in sequence for five times, or filtering them with 0.22 μm aqueous filter membrane and 0.22 μm organic filter membrane in sequence for five times; finally obtaining a dark brown liquid in the filter bottle below the filter membrane, i.e., aqueous solution of nitrogen-phosphorus co-doped fluorescent CQDs, and a physical photograph of the aqueous solution is shown in the filter bottle on the right of FIG. 2 after adjustment to black and white; this aqueous solution of nitrogen-phosphorus co-doped fluorescent CQDs fluoresces bright blue under a 365 nm UV lamp, and the aqueous solution of fluorescent CQDs synthesized in Embodiment 3 then fluoresces light blue under the 365 nm UV lamp, the aqueous solution of nitrogen-phosphorus co-doped fluorescent CQDs obtained in this embodiment fluoresces brighter blue under a 365 nm UV lamp compared to fluorescent CQDs synthesized in Embodiment 3; on the left and right of FIG. 3 are the fluorescent CQDs aqueous solution synthesized in Embodiment 3 and the nitrogen-phosphorus co-doped fluorescent CQDs aqueous solution synthesized in this embodiment with the fluorescence under a 365 nm UV lamp adjusted to black and white, respectively; the fluorescence photos of the two solutions are actually light blue and bright blue, respectively; after the graph is adjusted to black and white, it cannot reflect their actual colors, but the comparison of the color shades and transparency of the two in FIG. 3 shows that the fluorescence effect of the aqueous solution of nitrogen-phosphorus co-doped fluorescent CQDs synthesized in this embodiment is better, indicating that the co-doping of nitrogen-phosphorus improves the luminous intensity of fluorescent CQDs with high fluorescence quantum yields;

4) freeze-drying the obtained fluorescent CQDs aqueous solution to obtain nitrogen-phosphorus co-doped fluorescent CQDs powder derived from apple tree leaves; as shown in FIGS. 4 and 5, the synthesized CQDs have high crystallinity and a quasi-spherical shape without any agglomeration, and the particle sizes as shown in histogram of FIG. 6 are fine with an average particle size of 2.0 nanometers (nm) and a narrow particle size distribution range (1.1-3.0 nm); FIG. 7 is an X-ray photoelectron spectroscopy (XPS) spectra of the obtained CQDs, showing that the CQDs are composed of four elements, carbon (C), oxygen (O), nitrogen (N) and phosphorus (P), with the content ratios of 67.97%, 23.64%, 7.64% and 0.75% respectively; and it can be seen from the infrared spectra in FIG. 8 that the nitrogen-phosphorus co-doped fluorescent CQDs synthesized by adding urea phosphate have rather rich organic functional groups such as nitrogen and phosphorus on their surface, which endow the CQDs with wonderful water solubility and excellent fluorescence performance;

5) it can be seen from FIG. 9 that the synthesized nitrogen-phosphorus co-doped fluorescent CQDs have an optimal excitation wavelength of 330 nm, and a corresponding optimal emission wavelength of 400 nm; using quinine sulfate as fluorescence standard, obtaining fluorescence quantum yield of the nitrogen-phosphorus co-doped fluorescent CQDs aqueous solution obtained in step 3) by a reference method at the excitation wavelength of 330 nm to be about 18.1%;

6) respectively adding various metal ions ($Zn^{2+}$, $Sr^{3+}$, $Cr^{3+}$, $Ag^+$, $Mn^{2+}$, $Fe^{3+}$, $CO^{2+}$, $Cd^{2+}$, $Cu^{2+}$, $Zr^{4+}$, $Na^+$, $Pb^{2+}$, $Ba^{2+}$, $Al^{3+}$, $K^+$, $Mg^{2+}$, $La^{3+}$, $Ca^{2+}$) at a concentration of 250 micromole (μM) to 1 mL of a solution of nitrogen-phosphorus co-doped CQDs at a concentration of 50 μg/mL, standing for 5 min at room temperature and measuring PL spectra of each mixture under light excitation at 330 nm and recording their emission intensity at 400 nm; it can be seen from FIG. 10 that only $Fe^{3+}$ among various metal ions significantly quenched the fluorescence of nitrogen-phosphorus co-doped fluorescent CQDs, indicating that the synthesized nitrogen-phosphorus co-doped fluorescent CQDs can specifically identify $Fe^{3+}$ in water;

7) adding $Fe^{3+}$ with a concentration ranging from 0 to 300 μM into the nitrogen-phosphorus co-doped fluorescent CQDs with the concentration of 50 μg/mL, and drawing standard curve as shown in FIG. 11 according to fluorescence intensity change of nitrogen-phosphorus co-doped fluorescent CQDs at 400 nm, where a good linear relationship between the concentration of $Fe^{3+}$ ions and fluorescence intensity change can be seen in the range of 0-160 μm; as a fluorescent probe for detecting $Fe^{3+}$, nitrogen-phosphorus co-doped fluorescent CQDs can quickly and sensitively detect trace amounts of $Fe^{3+}$ in tap water with a detection limit of 4.0 μM, which is less than that of Fe in drinking water of 5.4 μM; and 8) using MTT (3-(4,5-dimethyl-2-thiazolyl)-2,5-diphenyl-2-H-tetrazolium bromide) method to evaluate toxicity and imaging ability of nitrogen-phosphorus co-doped fluorescent CQDs on A549 cells with results shown in FIG. 12*a* and FIG. 12*b*, where FIG. 12*a* shows that when the concentration of CQDs is as high as 500 μg/mL, the cells can still keep more than 90% activity; the cells cultured with nitrogen-phosphorus co-doped fluorescent CQDs emit a bright blue fluorescence around the cells under 405 nm light excitation, but there is no obvious change in the morphology of the cells; FIG. 12*b* shows the effect of adjusting the diagram of cell labeling imaging of cells cultured with nitrogen-phosphorus co-doped fluorescent CQDs to black and white, as the diagram is black and white, it does not reflect the bright blue fluorescence around the cells under 405 nm light excitation, but it can be seen that the morphology of the cells has not changed significantly, indicating that the synthesized nitrogen-phosphorus co-doped fluorescent CQDs has low toxicity and good biocompatibility in addition to a great application prospect in biological imaging.

Embodiment 2

A method for synthesizing nitrogen-phosphorus co-doped fluorescent CQDs in a green land cost-effective way includes the following steps:

1) collecting discarded apple leaves as shown in FIG. 1, cleaning them with deionized water, drying them in an oven at 80° C. for 24 h, and then grinding them into powder with a mortar;

2) dissolving 0.1 g urea phosphate in 60 mL deionized water, adding 1.0 g leaf powder and mixing well into a mixture; transferring the mixture to a 100 mL reaction kettle, then putting the reaction kettle in an oven, heating it to 240° C. at a heating rate of 5° C./min, and keeping the temperature for 6 h;

3) taking out the reaction kettle when the oven temperature drops to room temperature, taking out the lining, pouring reactants into a 100 mL beaker, and then filtering the reactants with 0.22 μm organic filter membrane and 0.22 μm aqueous filter membrane in sequence for five times, or filtering them with 0.22 μm aqueous filter membrane and 0.22 μm organic filter membrane in sequence for five times; finally, obtaining a brown liquid, i.e., an aqueous solution of nitrogen-phosphorus co-doped fluorescent CQDs; and 4) freeze-drying the obtained fluorescent CQDs aqueous solution to obtain nitrogen-phosphorus co-doped fluorescent CQDs powder derived from apple tree leaves.

Embodiment 3

Figure 13:
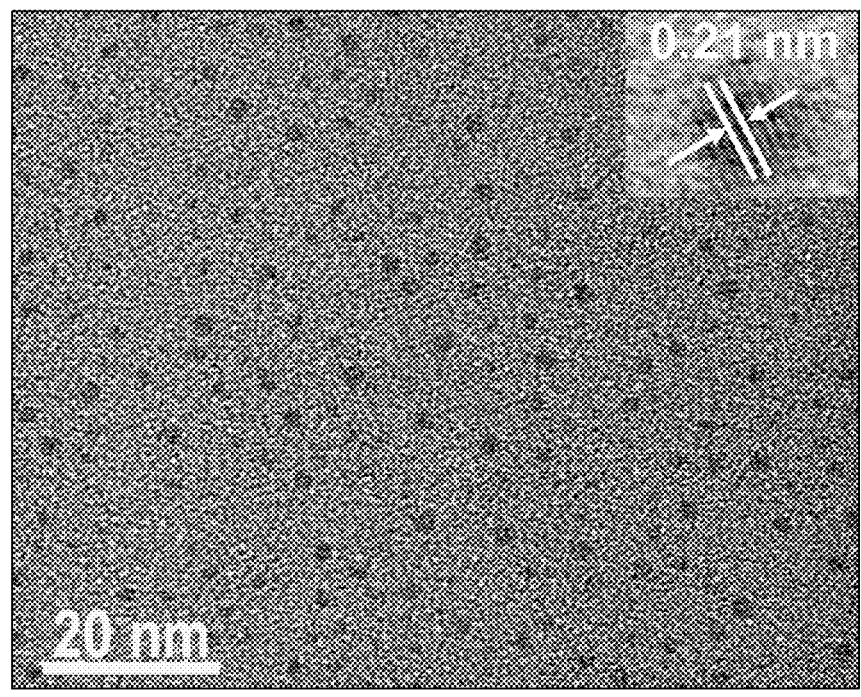
FIG. 13 shows a TEM image of the fluorescent CQDs synthesized in Embodiment 3 of the present application (with high-resolution TEM image illustrated in the upper right corner).
Figure 14:
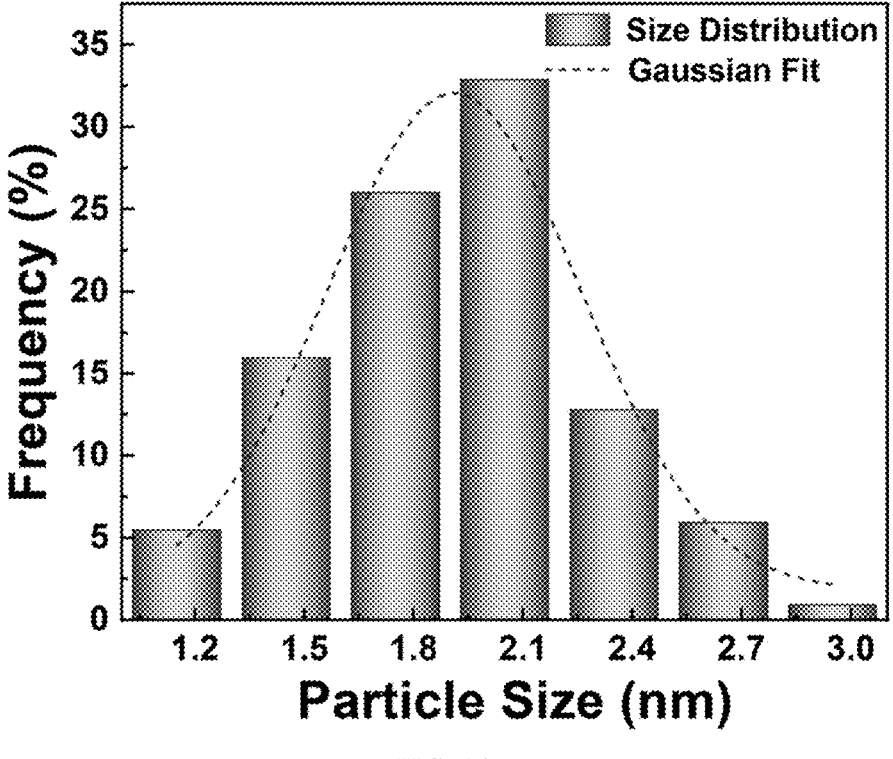
FIG. 14 is a histogram showing particle size distribution of fluorescent CQDs synthesized in Embodiment 3 of the present application.

A method for synthesizing fluorescence CQDs in a green and cost-effective way includes the following steps:

1) collecting discarded apple leaves as shown in FIG. 1, cleaning them with deionized water, drying them in an oven at 80° C. for 24 h, and then grinding them into powder with a mortar;

2) adding 1.0 g of leaf powder into 60 mL of deionized water, mixing well into a mixture, then transferring the mixture to a 100 mL reaction kettle, putting the reaction kettle in an oven, and heating it at a heating rate of 5° C./min for 240° C. for 6 h;

3) taking out the reaction kettle, taking out the lining, reactants into a 100 mL beaker, and then filtering the reactants with 0.22 μm organic filter membrane and 0.22 μm aqueous filter membrane in sequence for five times, or filtering them with 0.22 μm aqueous filter membrane and 0.22 μm organic filter membrane in sequence for five times; finally, obtaining a light brown liquid, i.e., aqueous solution of CQDs in the filter bottle below the filter membrane as shown on the left side of FIG. 2, and it emits blue fluorescence under 365 nm ultraviolet lamp as shown on the left side of FIG. 3;

4) freeze-drying the obtained CQDs aqueous solution to obtain apple tree leaf-derived fluorescent CQDs powder; FIG. 13 shows TEM image of the synthesized fluorescent CQDs, which have high crystallinity and a quasi-spherical shape without any agglomeration, a fine particle size (an average particle size of 1.9 nm) and narrow particle size distribution (1.1-3.0 nm) as shown in FIG. 14; it can also be seen that the obtained fluorescent CQDs have rich organic functional groups on their surface, which endows them with good water solubility; and 5) as can be seen from FIG. 9, the synthesized fluorescent CQDs have an optimal excitation wavelength of 330 nm, and a corresponding optimal emission wavelength of about 400 nm; with quinine sulfate as the fluorescence standard, the aqueous solution of fluorescent CQDs obtained in step 3) have a fluorescence quantum yield of about 8.8% by the reference method at the excitation wavelength of 330 nm.

What is claimed is:

1. A method for synthesizing fluorescent carbon quantum dots (CQDs), comprising:

S1, performing hydrothermal reaction on a mixture containing leaf powder, urea phosphate and deionized water at a temperature in a range of 200-240 degrees Celsius (° C.) to obtain a product, wherein a mass ratio of the urea phosphate to the leaf powder of less than or equal to 0.2; and S2, removing by-products in the product by filtering the product with an organic filter membrane and an aqueous filter membrane for several times, followed by collecting filtered filtrate, and freeze-drying the filtrate to obtain the fluorescent CQDs, wherein the fluorescent CQDs are nitrogen-phosphorus co-doped.

2. The method for synthesizing fluorescent CQDs according to claim 1, wherein in S1, the mixture is heated from room temperature to the temperature in the range of 200-240° C. at a heating rate in a range of 5-10° C. per minute (° C./min).

3. The method for synthesizing fluorescent CQDs according to claim 1, wherein in S1, the mixture is subjected to the hydrothermal reaction at the temperature in the range of 200-240° C. for a duration in a range of 5-6 hours (h) to obtain the product.

* * * * *